US007275048B2

(12) United States Patent
Bigus et al.

(10) Patent No.: US 7,275,048 B2
(45) Date of Patent: Sep. 25, 2007

(54) PRODUCT SUPPORT OF COMPUTER-RELATED PRODUCTS USING INTELLIGENT AGENTS

(75) Inventors: Joseph Philip Bigus, Rochester, MN (US); Carol Ann Egan, Rochester, MN (US); Earl Walter Emerick, Rochester, MN (US); Terry C. Reed, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 10/021,203

(22) Filed: Oct. 30, 2001

(65) Prior Publication Data

US 2003/0084009 A1    May 1, 2003

(51) Int. Cl.
*G06F 17/00* (2006.01)
*G06N 5/02* (2006.01)

(52) U.S. Cl. .............................. 706/46; 706/25; 706/10

(58) Field of Classification Search .................. 706/46, 706/25, 10, 1, 14, 23, 48, 52, 900, 903, 911; 714/1–2, 100, 47–48, 25, 799, 4; 707/202; 361/683; 717/168, 174
See application file for complete search history.

(56) References Cited

U.S. PATENT DOCUMENTS

| | | | | |
|---|---|---|---|---|
| 4,943,932 A | * | 7/1990 | Lark et al. ..................... 706/60 |
| 5,455,890 A | * | 10/1995 | Wang ........................... 706/16 |
| 5,495,607 A | * | 2/1996 | Pisello et al. .................. 707/10 |
| 5,553,145 A | | 9/1996 | Micali | |
| 5,678,002 A | * | 10/1997 | Fawcett et al. ............. 715/709 |
| 5,745,754 A | * | 4/1998 | Lagarde et al. .......... 707/104.1 |
| 5,752,246 A | * | 5/1998 | Rogers et al. ................ 707/10 |
| 5,765,028 A | * | 6/1998 | Gladden ....................... 706/25 |
| 5,790,789 A | * | 8/1998 | Suarez ........................ 709/202 |
| 5,905,495 A | | 5/1999 | Tanaka et al. | |

(Continued)

FOREIGN PATENT DOCUMENTS

JP    11157214 A  *  6/1999

OTHER PUBLICATIONS

Kopelman; Accelerated engineering: the 3 secrets to just-in-time product development (JITPD); WESCON/94. 'Idea/Microelectronics'. Conference Record; Sep. 27-29, 1994; pp. 362-367.*

(Continued)

*Primary Examiner*—Joseph P. Hirl
(74) *Attorney, Agent, or Firm*—Wood, Herron & Evans, L.L.P.

(57) ABSTRACT

An apparatus, program product, and method utilize a dynamic, automated, extensible and flexible intelligent agent-based product support "framework" to facilitate the provision of product support services to customers of computer-related products. Agent platforms are utilized on both a customer computer and a product support computer, with different agents configured to execute on one or both of such computers. Automated analysis and/or creation of remedial actions, based upon cross-customer operational data, and often relying upon intelligent agents for many or all of such actions, may be used to decrease product support personnel burden and effort. Publishing control may be provided to limit distribution of certain intelligent agents, as may multi-agent remediation of undesirable operational conditions, where agents from multiple parties collectively address a problem experienced by a customer.

36 Claims, 4 Drawing Sheets

U.S. PATENT DOCUMENTS

| | | | |
|---|---|---|---|
| 5,933,647 A | 8/1999 | Aronberg et al. | |
| 5,963,447 A * | 10/1999 | Kohn et al. | 700/49 |
| 5,987,135 A * | 11/1999 | Johnson et al. | 709/224 |
| 6,012,152 A * | 1/2000 | Douik et al. | 714/26 |
| 6,021,437 A * | 2/2000 | Chen et al. | 709/224 |
| 6,023,586 A | 2/2000 | Gaisford et al. | |
| 6,029,258 A * | 2/2000 | Ahmad | 714/46 |
| 6,049,819 A * | 4/2000 | Buckle et al. | 709/202 |
| 6,061,792 A | 5/2000 | Simon | |
| 6,070,182 A * | 5/2000 | Rao et al. | 708/708 |
| 6,070,185 A | 5/2000 | Anupam et al. | 709/204 |
| 6,085,178 A * | 7/2000 | Bigus et al. | 705/80 |
| 6,088,689 A * | 7/2000 | Kohn et al. | 706/10 |
| 6,094,655 A * | 7/2000 | Rogers et al. | 707/10 |
| 6,108,616 A * | 8/2000 | Borchers et al. | 702/183 |
| 6,117,188 A * | 9/2000 | Aronberg et al. | 717/176 |
| 6,145,096 A * | 11/2000 | Bereiter et al. | 714/25 |
| 6,148,607 A | 11/2000 | Leipow | |
| 6,151,643 A * | 11/2000 | Cheng et al. | 710/36 |
| 6,182,136 B1 | 1/2001 | Ramanathan et al. | 709/224 |
| 6,192,354 B1 | 2/2001 | Bigus et al. | 706/46 |
| 6,199,099 B1 | 3/2001 | Gershman et al. | 709/203 |
| 6,202,199 B1 | 3/2001 | Wygodny et al. | 717/4 |
| 6,212,649 B1 * | 4/2001 | Yalowitz et al. | 714/31 |
| 6,216,098 B1 * | 4/2001 | Clancey et al. | 703/6 |
| 6,256,773 B1 * | 7/2001 | Bowman-Amuah | 717/121 |
| 6,275,976 B1 * | 8/2001 | Scandura | 717/120 |
| 6,282,701 B1 * | 8/2001 | Wygodny et al. | 717/125 |
| 6,286,047 B1 | 9/2001 | Ramanathan et al. | 709/224 |
| 6,292,830 B1 * | 9/2001 | Taylor et al. | 709/224 |
| 6,301,612 B1 | 10/2001 | Selitrennikoff et al. | |
| 6,324,647 B1 * | 11/2001 | Bowman-Amuah | 726/23 |
| 6,345,264 B1 | 2/2002 | Breese et al. | |
| 6,360,193 B1 * | 3/2002 | Stoyen | 703/17 |
| 6,370,573 B1 * | 4/2002 | Bowman-Amuah | 709/223 |
| 6,401,080 B1 | 6/2002 | Bigus et al. | |
| 6,427,142 B1 * | 7/2002 | Zachary et al. | 706/49 |
| 6,442,438 B1 * | 8/2002 | Naillon | 700/36 |
| 6,460,070 B1 * | 10/2002 | Turek et al. | 709/202 |
| 6,484,155 B1 * | 11/2002 | Kiss et al. | 706/46 |
| 6,490,574 B1 * | 12/2002 | Bennett et al. | 706/47 |
| 6,658,453 B1 * | 12/2003 | Dattatri | 709/202 |
| 6,671,724 B1 * | 12/2003 | Pandya et al. | 709/226 |
| 6,671,818 B1 * | 12/2003 | Mikurak | 714/4 |
| 6,694,314 B1 * | 2/2004 | Sullivan et al. | 707/10 |
| 6,741,975 B1 * | 5/2004 | Nakisa et al. | 706/47 |
| 6,742,015 B1 * | 5/2004 | Bowman-Amuah | 718/101 |
| 6,754,643 B1 * | 6/2004 | Goldsmith | 706/14 |
| 6,754,691 B1 * | 6/2004 | Gomi et al. | 709/202 |
| 6,757,689 B2 * | 6/2004 | Battas et al. | 707/101 |
| 6,775,830 B1 * | 8/2004 | Matsunami et al. | 717/176 |
| 6,785,834 B2 * | 8/2004 | Chefalas et al. | 714/4 |
| 6,851,115 B1 * | 2/2005 | Cheyer et al. | 719/317 |
| 6,922,684 B1 * | 7/2005 | Aldridge et al. | 706/60 |
| 6,971,094 B1 * | 11/2005 | Ly | 717/172 |
| 6,988,279 B1 * | 1/2006 | Kanevsky | 726/2 |
| 2002/0052797 A1 * | 5/2002 | Maritzen et al. | 705/26 |
| 2002/0091991 A1 * | 7/2002 | Castro | 717/106 |
| 2003/0033266 A1 * | 2/2003 | Schott et al. | 706/45 |
| 2003/0084010 A1 * | 5/2003 | Bigus et al. | 706/6 |
| 2004/0024656 A1 * | 2/2004 | Coleman | 705/27 |
| 2004/0059929 A1 | 3/2004 | Rodgers et al. | |
| 2004/0205034 A1 * | 10/2004 | Bigus et al. | 706/10 |

OTHER PUBLICATIONS

Stidolph; Evolutionary design of complex software (EDCS) demonstration days 1999; ACM SIGSOFT Software Engineering Notes; vol. 25, Is. 1; Jan. 2000.*

Purssell; The product release interface: environment and concerns; Fifth Electronic Manufacturing Technology Symposium International 'Design-to-Manufacturing Transfer Cycle'; Oct. 10-12, 1988; pp. 51-56.*

Manderson; Satellite systems: How to distribute data, computing, consulting, and responsibility; Proceedings of the 17th annual ACM SIGUCCS conference on User Services; Oct. 1989.*

Sim et al; Simulation of a multi-agent protocol for task allocation in cooperative design; IEEE International Conference on Systems, Man, and Cybernetics Proceedings; vol. 3; Oct. 12-15, 1999; pp. 95-100.*

Nonogaki et al; FRIEND21 project: a construction of 21st century human interface; Proceedings of the SIGCHI conference on Human factors in computing systems: Reaching through technology; Mar. 1991; pp. 407-414.*

Freier et al; The SSL Protocol Version 3.0; Mar. 1996; 55 pages.*

Bigus et al; Constructing Intelligent Agents Using Java: Professional Developer's Guide, 2nd Edition; Mar. 2001; pp. 1-19.*

Bigus; Applying neural networks to computer system performance tuning; IEEE World Congress on Computational Intelligence; IEEE International Conference on Neural Networks; vol. 4, Jun. 27-Jul. 2, 1994; pp. 2442-2447.*

Bigus; The agent building and learning environment; Jun. 2000; Proceedings of the fourth international conference on Autonomous agents; pp. 108-109.*

Bigus et al; AutoTune: A Generic Agent for Automated Performance Tuning; Practical Applications of Intelligent Agents and Multi-Agent Technology; 2000.* http://www.research.ibm.com/able/; Jun. 19, 2001; 4 pages.* http://www.research.ibm.com/able/; Dec. 5, 2000; 1 page.*

Biron et al; IDEAL: A multi-agent architecture for the management of complex networks; IEEE International Conference on Communications Technical Program Conference Record; vol. 3; May 23-26, 1993; pp. 1875-1879.*

Junpu et al; An architecture of agent-based intelligent control systems; Proceedings of the 3rd World Congress on Intelligent Control and Automation; vol. 1; Jun. 28-Jul. 2, 2000; pp. 404-407.*

Kim et al; Implementation of a distributed problem solving framework based on discrete event system specification; IEEE International Conference on Systems, Man and Cybernetics; Intelligent Systems for the 21st Century; vol. 5; Oct. 22-25, 1995; pp. 4178-4183.*

Seo et al; A fuzzy reinforcement function for the intelligent agent to process vague goals; 19th International Conference of the North American Fuzzy Information Processing Society; Jul. 13-15, 2000; pp. 29-33.*

Yen; Fuzzy logic and intelligent agents; IEEE International Fuzzy Systems Conference Proceedings; vol. 1; Aug. 22-25, 1999; pp. 342-343.*

Blake; Rule-driven coordination agents; a self-configurable agent architecture for distributed control; 5th International Symposium on Autonomous Decentralized Systems Proceedings; Mar. 26-28, 2001; pp. 271-277.*

Garcia et al; A decentralised and extensible system of Java concurrent objects to monitor and control TCP/IP networks; IEEE International Conference on Communications; vol. 1; Jun. 18-22, 2000; pp. 175-180.*

Gerkey et al; Murdoch: publish/subscribe task allocation for heterogeneous agents; Proceedings of the fourth international conference on Autonomous agents; Jun. 2000; pp. 203-204.*

Huang et al; A constructing scheme for autonomous distributed control systems with multi-agent society; Third International Symposium on Autonomous Decentralized Systems Proceedings; Apr. 9-11, 1997; pp. 17-24.*

Tomita et al; A cooperative protection system with an agent model; IEEE Transactions on Power Delivery; vol. 13, Is. 4; Oct. 1998; pp. 1060-1066.*

Sapaty et al; WAVE: mobile intelligence in open networks; First Annual Conference on Emerging Technologies and Applications in Communications Proceedings; May 7-10, 1996; pp. 192-195.*

Somers; Hybrid: unifying centralised and distributed network management using intelligent agents; IEEE Network Operations and Management Symposium; vol. 1; Apr. 15-19, 1996; pp. 34-43.*

Gou et al; Agent-based virtual enterprise modeling and operation control; IEEE International Conference on Systems, Man, and Cybernetics; vol. 3; Oct. 7-10, 2001; pp. 2058-2063.*

Vincent et al; Implementing soft real-time agent control'; Proceedings of the fifth international conference on Autonomous agents; May 2001; pp. 355-362.*

Liu et al; Intelligent service creation environment for IN; International Conference on Communication Technology Proceedings; vol. 2; Aug. 21-25, 2000; pp. 1098-1101.*

Marcus; Improving reliability of intelligent agents for network management; Proceedings of the Sixth IFIP/IEEE International Symposium on Integrated Network Management; Distributed Management for the Networked Millennium; May 24-28, 1999; pp. 941-942.*

Yu et al; Evolving intelligent text-based agents; Jun. 2000; Proceedings of the fourth international conference on Autonomous agents; pp. 388-395.*

Object Management Group, Inc., *Mobile Agent Facility Specification*, New Edition: Jan. 2000; GMD Fokus and IBM (1999).

Bieszczad, Andrzej et al., "Management of Heterogeneous Networks with Intelligent Agents", *Bell Labs Technical Journal*, Lucent Technologies, Inc., (Oct.-Dec. 1999), pp. 109-135.

U.S. Appl. No. 08/821,935, entitled "Intelligent Agent with Negotiation Capability and Method of Negotiation Therewith," filed on Mar. 21, 1997 by Bigus et al. (RO996-054).

U.S. Appl. No. 08/822,993, entitled "Apparatus and Method for Optimizing the Performance of Computer Tasks Using Intelligent Agent with Multiple Program Modules Having Varied Degrees of Domain Knowledge," filed on Mar. 21, 1997 by Bigus et al. (RO996-052).

Hoff, et al., "The Open Software Description Format (OSD)" Aug. 11, 1997 W3C.

Covaci, Stefan et al., "Mobile Intelligent Agents for the Management of the Information Infrastructure", (1998) IEEE, document No. 1060-3425/98, 10 pages.

Bigus, Joseph Philip et al., "Optimizing the Performance of Computer Tasks Using Intelligent Agent with Multiple Program Modules Having Varied Degrees of Domain Knowledge", U.S. Appl. No. 09/100,595 filed on Jun. 19, 1998.

Bigus, Joseph Philip et al., "Intelligent Agent with Negotiation Capability and Method of Negotiation Therewith", U.S. Appl. No. 09/431,833 filed Nov. 2, 1999.

* cited by examiner

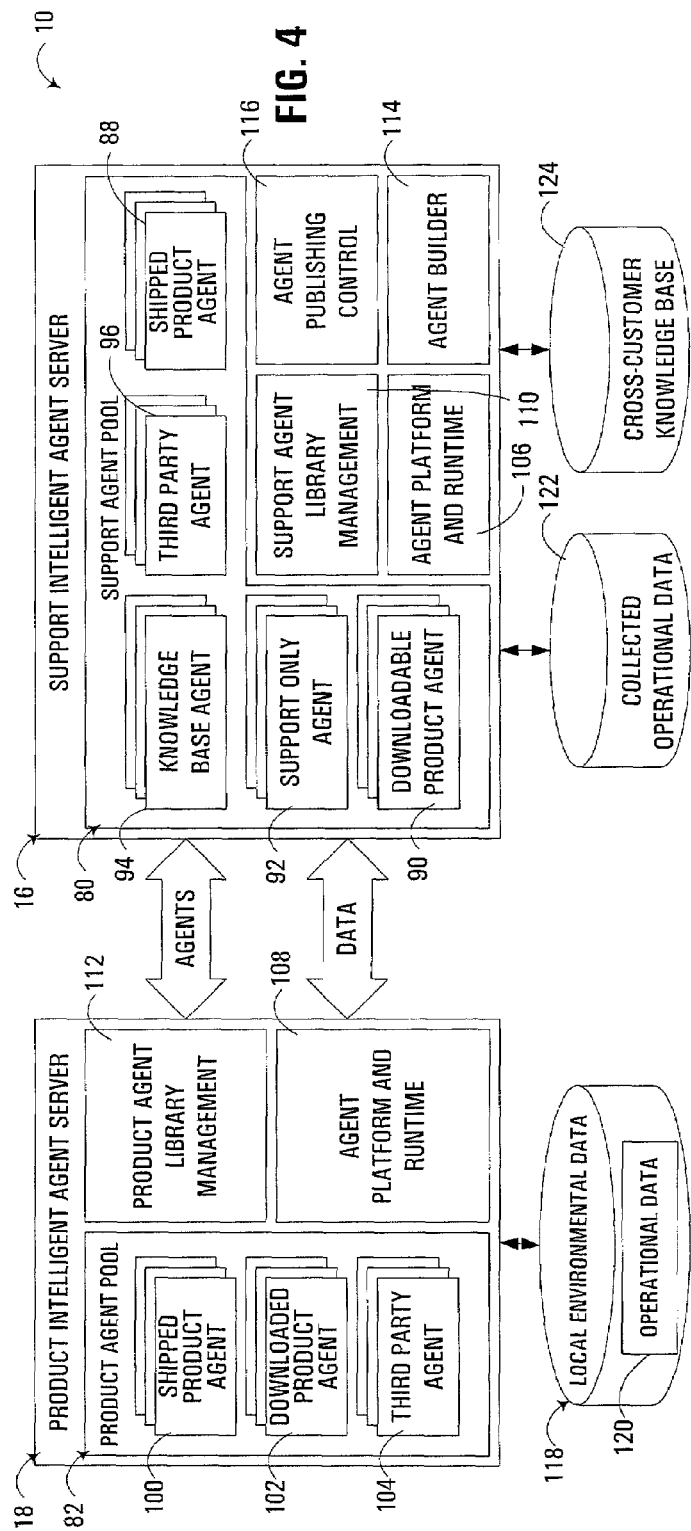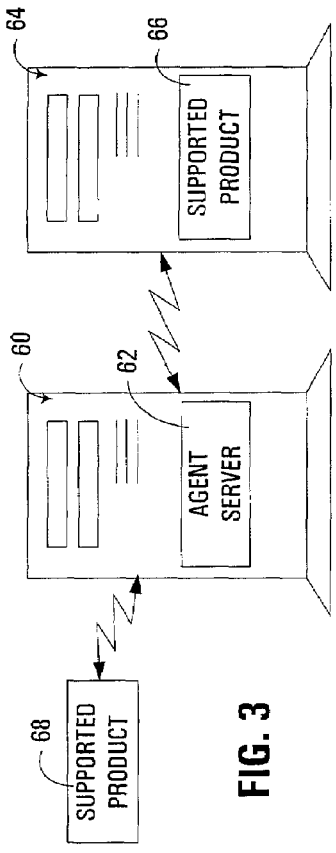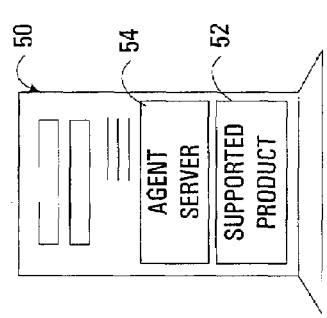

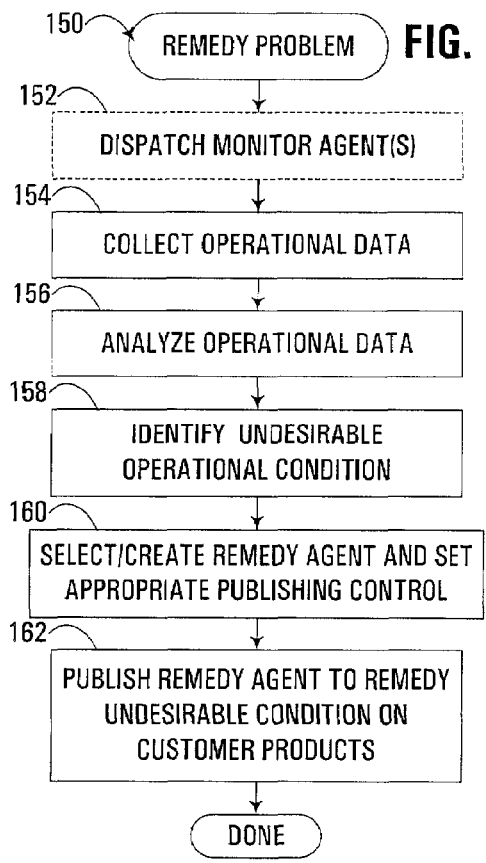
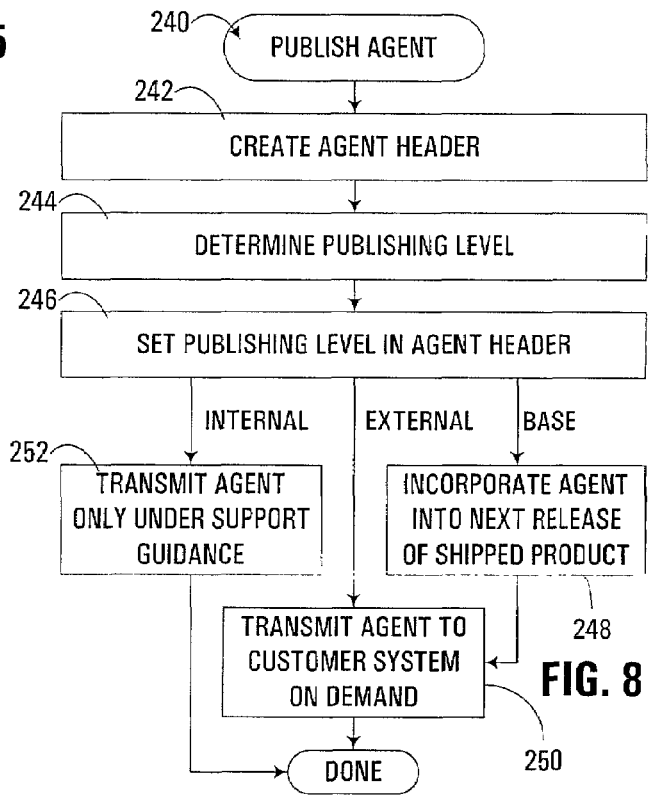
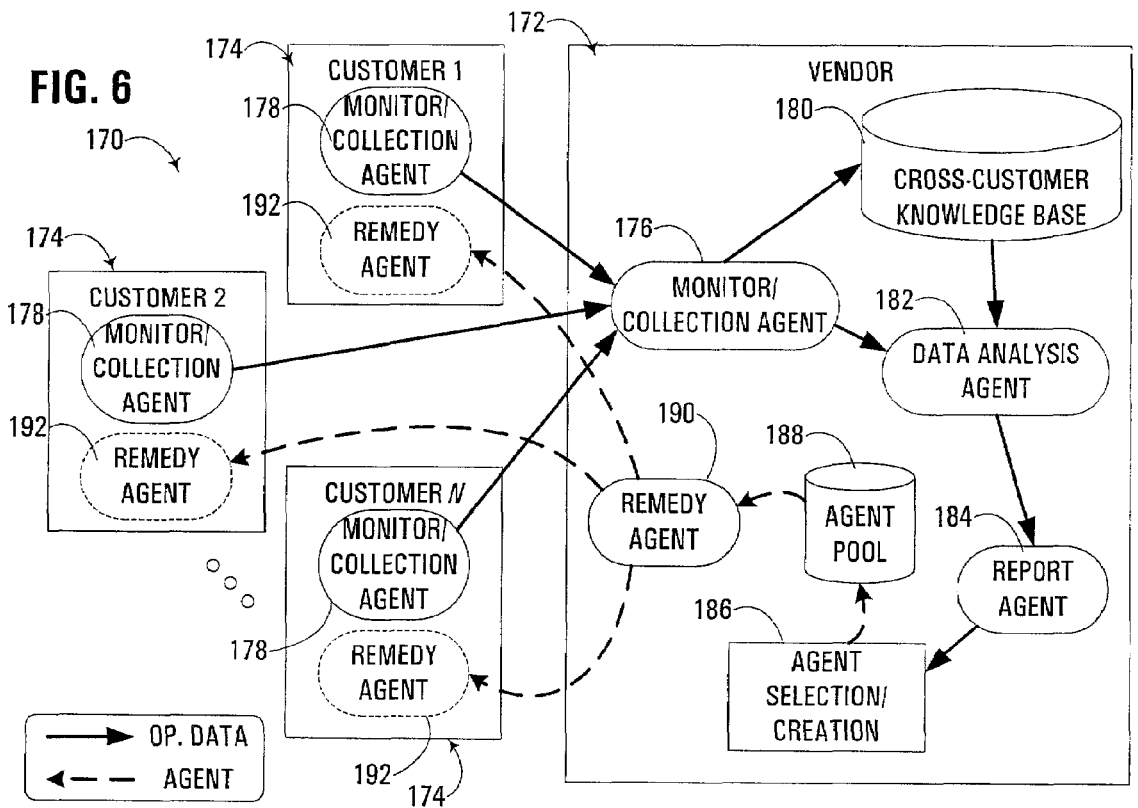

PRODUCT SUPPORT OF COMPUTER-RELATED PRODUCTS USING INTELLIGENT AGENTS

FIELD OF THE INVENTION

The invention is generally related to computers and computer software, and in particular to computer software suitable for use in providing computer-assisted product support of computer-related products.

BACKGROUND OF THE INVENTION

The Internet has grown at a remarkable pace, and has become firmly entrenched in nearly all aspects of society. Whereas the Internet initially was limited to purely academic and government endeavors, the Internet has now become an important avenue of commercial activity, not to mention an important source of educational, commercial and entertainment-related information. Moreover, in addition to simply operating as a source of information, the Internet provides a mechanism for bringing together individuals and entities from across the globe. As an example, for business enterprises, the Internet provides the ability to interact electronically with customers, as well as suppliers, distributors and other business partners. Even in non-commercial areas, the Internet enables individuals sharing common interests and avocations to interact and share information with one another.

Of particular importance, the Internet often provides business enterprises with the ability to interact electronically with their customers to provide a number of value added services for those customers.

For example, various Internet-based technologies have been developed to enhance the product support services provided by businesses to their customers. Perhaps not unexpectedly, the manufacturers, developers and other providers of computer-related products such as computers, peripherals, networking equipment, computer software, and other hardware and/or software products have taken the lead in utilizing Internet technologies to enhance the product support services they provide for their customers.

Conventional Internet-based product support technologies have focused primarily on providing on-line access to product support information, as well as providing on-line access to downloadable software patches, service packs, drivers, updates and the like subsequent to release of a computer-related product. In the former instance, users are often permitted to search knowledge bases to locate information about particular problems experienced by customers, as well as potential solutions, workarounds, and the like. In the latter instance, users may either be required to periodically check a manufacturer's website for new updates, or in the alternative, a manufacturer may find an update sufficiently important to warrant notifying customers of the presence of new updates via email or regular mail.

Still other manufacturers support on-line "communities" such as news groups or forums, so that users can interact with one another (or even with a manufacturer's product support personnel) to ask questions and obtain solutions. Such communities are also typically searchable by users so that the solutions to particular questions can be found without having to pose the questions to the communities anew. In still other environments, real-time assistance, such as interactive chat sessions, may be used to enable customers to obtain useful information from a product manufacturer.

While conventional product support technologies often provide some degree of assistance to customers, in many instances the manual process of searching knowledge bases, downloading patches, reconfiguring systems, etc., becomes excessively burdensome. Furthermore, the potential problems experienced by customers continue to increase in both number and complexity, often necessitating even more manual frequent interaction with product support technologies.

In particular, many computer systems incorporate numerous hardware and software components, many of which are supplied by multiple vendors. And with the advent of "open" systems, which permit the products of third party vendors to be installed into a particular manufacturer's computer systems, often without any certification or explicit acceptance by the manufacturer, many manufacturers are simply unable to adequately test all permutations and combinations of hardware and software solutions that customers may have installed in their particular installations. Adding to this difficulty are the relatively short product development cycles imposed by the marketplace, which effectively ensure that at least some incompatibilities will arise subsequent to any major release of a computer-related product.

To address some of these difficulties, various types of computer software have been utilized to better automate the provision of product support. For example, some software vendors utilize remote control software that allows product support personnel to remotely connect to a customer's computer and permit the personnel to remedy any problems therewith, e.g., by perusing and correcting configuration settings on a customer's computer.

As another example, automated update programs have been developed for the purpose of analyzing a particular installation to determine what current software is installed, comparing this information with a database of known updates to that software, and then automating the download and installation of any uninstalled updates. In some environments, the update programs are implemented using intelligent agents that are dispatched, or transmitted, to a particular customer's installation.

An intelligent agent, in general, is configured to operate much like software-implemented "assistant" to automate and simplify certain tasks in a way that hides its complexity from a user. An intelligent agent is typically characterized by the concept of delegation, where a user, or client, entrusts an agent to handle tasks with at least a certain degree of autonomy. Intelligent agents operate with varying degrees of constraints depending upon the amount of autonomy delegated to them by a user.

Intelligent agents may also have differing capabilities in terms of intelligence, mobility, and agency. Intelligence is generally the amount of reasoning and decision making that an agent possesses. This intelligence can be as simple as following a predefined set of rules, or as complex as learning and adapting based upon a user's objectives and the agent's available resources. An intelligent agent's intelligence or skill as applied to a specific field or function is often referred to as the domain knowledge for that agent.

Some intelligent agents are also characterized as being "mobile", by virtue of possessing the ability to be passed through a network and execute on different computer systems. Thus, while some agents may be designed to stay on one computer system and may never be passed to different machines, other agents may be mobile in the sense that they are designed to be passed from computer to computer while performing tasks at different stops along the way. To facilitate the distribution of agents and their interaction, significant development work has been directed toward standardized agent communities, where agents are configured to execute on standardized agent "platforms" and communicate according to standardized messaging protocols.

Agents have traditionally found a number of uses in a wide variety of applications, including systems and network management, mobile access and management, information access and management, collaboration, messaging, workflow and administrative management, and adaptive user interfaces. Another important use for agents is in electronic commerce, where an agent may be configured to seek out other parties such as other users, computer systems and agents, conduct negotiations on behalf of their client, and enter into commercial transactions.

Despite these usages of intelligent agents, in the field of product support, intelligent agents have yet to find widespread acceptance outside of the relatively narrow area of automating software updates. Of note, software updates most often result from some prior identification of various errors that require correction, followed by resolution of such problems through the development of new program code that corrects such errors. To date, the identification of errors often results from customer complaints or questions, which is typically collected manually by product support personnel in connection with resolving customer problems. It is often only after individual customers raise issues, and these issues are individually resolved by product support personnel, that global solutions to the issues are created and then distributed to other customers. Thus, even though the actual download of software updates may be somewhat automated in some environments, the underlying problem determination, problem source identification, and problem resolution steps that ultimately result in the generation of such software updates are still predominantly manual and labor-intensive processes.

Given the ever-increasing complexity of computer systems, components and software, it is anticipated that product support will continue to place an increasingly greater burden on manufacturers and developers of many computer-related products, thus driving up overhead and cutting into margins. A need therefore exists for utilizing increased automation in connection with the provision of product support, particularly in the areas of problem determination, identification and resolution. It is further anticipated that increased usage of intelligent agents in the provision of product support can address many of the burdens and inefficiencies that result from conventional product support efforts, and thus a need also exists for a manner of facilitating the penetration of intelligent agents into product support environments.

SUMMARY OF THE INVENTION

The invention addresses these and other problems associated with the prior art by providing an apparatus, program product, and method that utilize a dynamic, automated, extensible and flexible intelligent agent-based product support "framework" that facilitates the provision of product support services to customers of computer-related products.

In particular, the herein-described framework typically incorporates a distributed agent-based product support system including agent platforms that are utilized on both product support and customer sites to support multiple platforms upon which product support agents may reside to provide various product support operations across and throughout the system. Consistent with one aspect of the invention, therefore, a product support system may be provided in which first and second agent platforms are configured to execute respectively on a customer computer and a product support computer, and where first and second product support intelligent agents are configured to perform product support operations in connection with a computer-related product, with one such agent being capable of being dispatched to the customer computer for execution by the first agent platform, and with the other such agent capable of being executed by the second agent platform.

The herein-described framework also typically supports the ability to utilize cross-customer operational data in the determination, identification and/or remediation of potential problems or other undesirable operational conditions in and/or associated with a computer-related product, as well as to facilitate the distribution of remedial actions to multiple customers. For example, consistent with another aspect of the invention, product support for a computer-related product may be provided by collecting operational data from a plurality of customer computers that utilize the computer-related product, identifying an undesirable operational condition associated with the computer-related product from the collected operational data, creating a product support intelligent agent configured to remedy the undesirable operational condition, and distributing the product support intelligent agent to at least first and second customer computers from the plurality of customer computers to remedy the undesirable operational condition in the first and second customer computers.

As another example, intelligent agent technology may also be incorporated in the aforementioned framework to enhance the automated analysis of cross-customer operational data, and thus facilitate the identification of undesirable operational conditions associated with a computer-related product. Therefore, consistent with yet another aspect of the invention, product support for a computer-related product may be provided by collecting operational data from a plurality of customer computers that utilize the computer-related product during operation of the plurality of customer computers, analyzing the operational data from the plurality of customer computers using at least one intelligent agent, and identifying as a result of the analysis an undesirable operational condition associated with the computer-related product in at least one of the customer computers.

Given the distributed nature of the herein-described framework, it may also be desirable to provide distribution controls to assist in the effective management of intelligent agents in connection with providing product support of a computer-related product. In particular, intelligent agents may have different goals and capabilities, and may present certain risks if used by inexperienced users and/or in situations in which they were not intended to be used. As such, it may be desirable to associate distribution control information with certain intelligent agents to limit the ability of such intelligent agents to be distributed for execution in undesirable environments. Therefore, consistent with a further aspect of the invention, intelligent agents may be associated with distribution control information that defines distribution rights to such intelligent agents, whereby access to such intelligent agents is controlled in response to requests based upon the distribution control information associated with such intelligent agents.

It may also be desirable to incorporate support for intelligent agents supplied by different vendors into the herein-described framework. In particular, due to the relatively open nature of many computer environments, many such environments incorporate hardware and/or software components that are supplied by different vendors. Moreover, in many circumstances, incompatibilities between such components can result in errors or degraded system performance. Often, too, the incompatibilities may require corrective actions to be taken in connection with multiple components. As such, consistent with an additional aspect of the invention, product support for a computer-related product may be provided by executing first and second intelligent agents to respectively perform first and second tasks associated with remedying an undesirable operational condition associated with a customer computer that utilizes the computer-related product, where the first and second intelligent agents are respectively provided by first and second vendors that supply first and second components associated with the computer-related product.

It will be appreciated that the various aspects of the invention discussed above may be utilized either independently or collectively with one another in various embodiments of the invention. The invention is therefore not limited to any specific combination of the various aspects discussed above.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2 is a block diagram of an alternate customer installation to that illustrated in FIG. 1, wherein a supported product is a hardware or software component resident on a computer upon which is also resident an agent server.

FIG. 3 is a block diagram of another alternate customer installation to that illustrated in FIG. 1, wherein a supported product is a hardware or software component that is external to a computer upon which is resident an agent server.

FIG. 4 is a block diagram of the principal software components utilized in providing product support for a customer by a vendor in the distributed agent-based product support system of FIG. 1.

FIG. 5 is a flowchart illustrating an exemplary sequence of operations suitable for remedying a customer problem in the distributed agent-based product support system of FIG. 1.

FIG. 6 is a block diagram illustrating a collection of software components suitable for use in implementing the sequence of operations illustrated in FIG. 5.

FIG. 8 is a flowchart illustrating an exemplary sequence of operations suitable for publishing an agent in the distributed agent-based product support system of FIG. 1.

DETAILED DESCRIPTION

Figure 1:
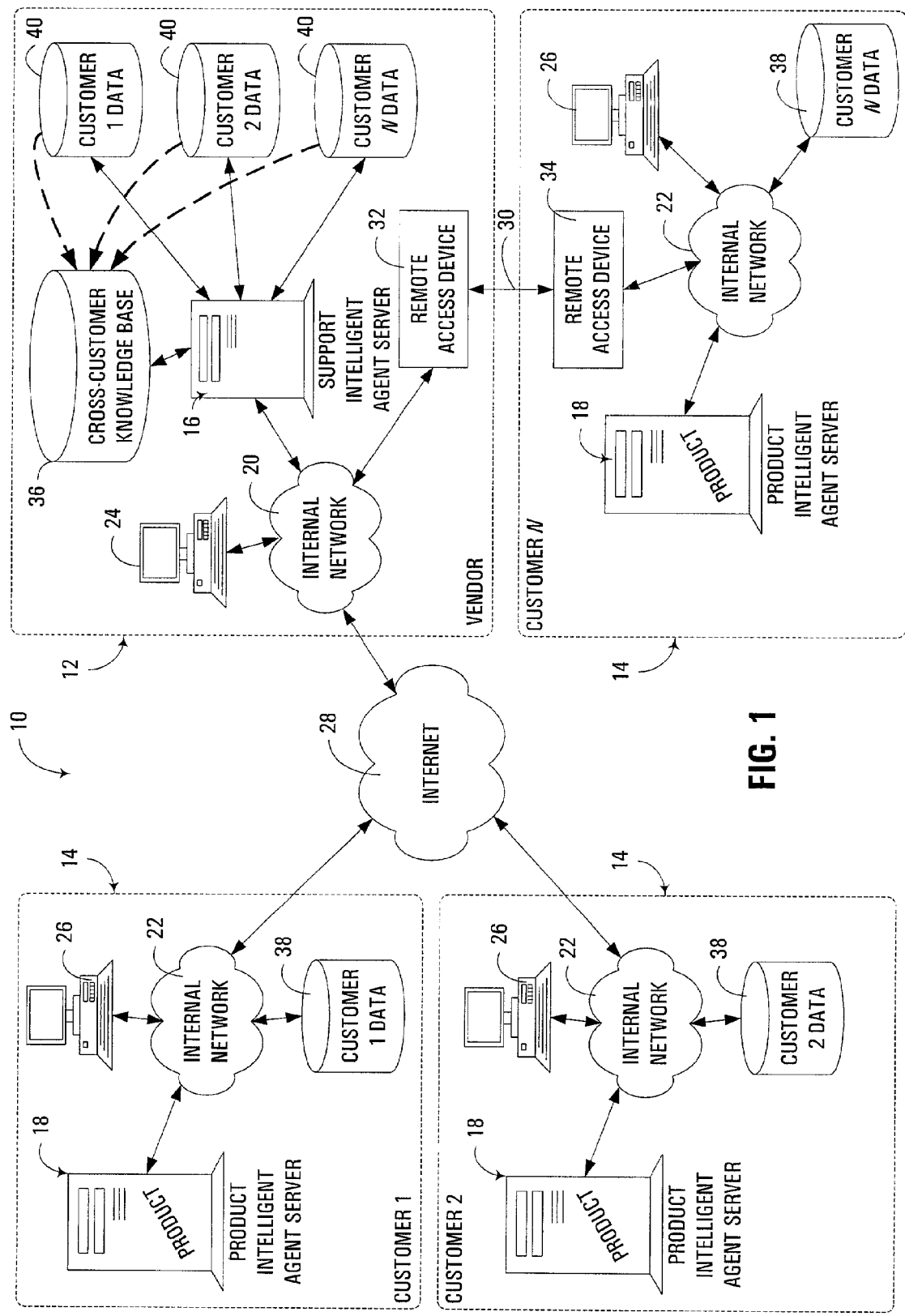
FIG. 1 is a block diagram of a distributed agent-based product support system consistent with the invention.

The embodiments described herein utilize a dynamic intelligent agent framework to facilitate the provision of product support to computer-related products. In many embodiments, human expertise may be captured and incorporated into intelligent agents, with a dynamic framework utilized to provide access to a library of such agents possessing functionalities in the areas of data collection and monitoring, data analysis, and problem resolution or remediation. Through such a framework, costs may often be reduced through ensuring that the latest problem analysis is deployable, and by testing for product quality by focusing across the most common uses and expanding diagnostics in the field. Moreover, product value can be added through the provision of off-release support facilities, as well as the ability to modify agents between releases based upon real customer experiences and situations.

In the embodiments discussed hereinafter, a distributed agent-based product support system is described in which agent servers are distributed between a vendor and one or more customers for the purpose of supporting computer-related products for such customers. Advantageously, agents are permitted to run on the back-end/support computers, directly on customer computers, or on both, and due to the mobile nature of some agents, agents can be dispatched (or brought to) the data necessary for monitoring purposes, or agents can pull such data to them for collection and analysis via remote access of a particular system.

Moreover, in many embodiments, off-release delivery of agents is supported, so that problems discovered after a release of a product can be addressed quickly and in a cost effective manner. Furthermore, operational data of multiple customers can be collected and analyzed, often using different artificial intelligence-based logic, to enable the resolution of problems or provision of solutions based upon a wide variety of customers, customer installations, situations, etc. Also, as will become more apparent below, through the use of advanced learning techniques, self-learning is often possible, based on an individual environment or on an "aggregate" of environments. In many instances, many of the product support tasks that were once manual operations can be automated, thus improving product quality and saving significant costs in the areas of product determination and problem resolution.

In addition, the framework described below provides the ability to encapsulate agents from multiple parties or entities, and otherwise utilize multiple agents to collectively perform tasks that comprise complete solutions to a customer problem. Agents can be partitioned based on their assigned tasks and required domain knowledge, and agents may call various sub-agents to handle specific tasks, or in the alternative, multiple agents may be combined into a single agent to address a particular customer problem. Through this "modular" approach, agents may be constructed from multiple pre-built agents or modules, thereby often saving substantial development time and effort.

Turning to the drawings, wherein like numbers denote like parts throughout the several views, FIG. 1 illustrates a distributed agent-based product support system 10 consistent with the invention. In implementing such a distributed system, a vendor, or product support site 12 is interfaced with a plurality of customer sites 14 (for customers 1 . . . N) to provide product support for a plurality of supported products purchased or otherwise acquired by each customer. To support distributed agent-based product support, a support intelligent agent server 16 is resident at the vendor site, while product intelligent agent servers 18 are illustrated as resident on supported products at each customer site. It should appreciate that the vendor, as well as each customer, may have multiple sites interfaced within product support system 10, and that multiple vendors may be interfaced within the product support system as well.

In the illustrated implementation of FIG. 1, the supported product is a computer, e.g., a multi-user computer such as an AS/400 or eServer iSeries midrange computer available from International Business Machines Corporation. Moreover, in this implementation, the supported product additionally hosts the customer site-based product support components for system 10, e.g., the product intelligent agent support servers 18. As will be discussed in greater detail below, however, a wide variety of other computer-related products may be supported using system 10 without departing from the spirit and scope of the invention.

Various manners of interconnecting support intelligent agent server 16 and product intelligent agent servers 18 may be used consistent with the invention. For example, at each site, an internal network 20,22 such as a local area network, may be coupled to the respective server 16, 18. Other computers, e.g., workstations 24,26, may also be coupled to networks 20, 22, and provide user access to servers 16, 18. It will be appreciated that multiple client computers, as well as other devices, may be coupled to internal networks 20,22 consistent with the invention.

One manner of interfacing a vendor site with a customer site is via Internet 28, as shown for customers 1 and 2. Through the use of the Internet, a ubiquitous communication path to a vendor site is easily provided, and through the use of conventional security tools, secure communications between vendor and customer sites may be obtained. It should be appreciated that each customer site may be connected to the Internet via a continuous link, or in the alternative, via a dial-up link as is well known in the art.

For some customer implementations, a direct point-to-point interconnection may be desired, e.g., as with interconnection 30 illustrated between vendor site 12 and customer site 14 for customer N. In such an implementation, remote access devices 32, 34 would typically be utilized at each site 12, 14 to provide the necessary interconnection. For example, each device 32, 34 may be a dial-up modem or similar private communications path. Other manners of interfacing a customer site with a vendor site may be used in the alternative.

One important aspect of providing product support in the manner described herein, and in particular for the purpose of identifying and diagnosing customer problems) is the incorporation of a cross-customer knowledge base 36 in vendor site 12, which includes problem identification, solution information, operational and environmental data based upon information collected from multiple customers. In addition, in the illustrated implementation each customer site includes local storage 38 for customer data, in particular, operational data associated with various operating characteristics of the supported product. As will be discussed in greater detail below, the operational data may incorporate any performance, configuration, runtime, or other data that characterizes the operation of a supported product, and which is capable of being monitored for the purpose of problem identification or optimization of operation efficiency. In the illustrated implementation, typically such operational data is forwarded to the vendor site and stored in centralized storage, e.g., as represented at 40. In some implementations, the operational data may be stored directly in cross-customer knowledge base 36, whereby separate storage for the operational data of each customer would not be required.

It will be appreciated that product support intelligent agent server 16, each supported product 18, each workstation 24,26 and any other interconnected device may be implemented using practically any type of computer, computer system or other programmable electronic device, including a client computer, a server computer, a portable computer, a handheld computer, an embedded controller, etc. Moreover, each such device may be implemented using multiple interconnected computers and/or electronic devices, e.g., in a cluster or other distributed computing environment. A number of the devices illustrated in FIG. 1 each comprise an "apparatus" that also may be referred to hereinafter as a "computer"; however, it should be appreciated the term "apparatus" may also include other suitable programmable electronic devices consistent with the invention.

Each of the aforementioned devices, when implemented as computers, will typically include one or more processors coupled to a memory. The memory may represent the random access memory (RAM) devices comprising the main storage of a computer, as well as any supplemental levels of memory, e.g., cache memories, non-volatile or backup memories (e.g., programmable or flash memories), read-only memories, etc. In addition, a memory may be considered to include memory storage physically located elsewhere in a computer, e.g., any cache memory in a processor, as well as any storage capacity used as a virtual memory, e.g., as stored on a mass storage device or on another computer coupled to such a computer via network or other form of interconnection.

It will also be appreciated that each computer typically receives a number of inputs and outputs for communicating information externally. For interface with a user or operator, a computer may include one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or device interfaced with a computer over a network.

For additional storage, each computer may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, a computer may include an interface with one or more networks (e.g., a LAN, a WAN, a wireless network, and/or the Internet, among others) to permit the communication of information with other computers coupled to the network.

Each computer typically operates under the control of an operating system, and executes or otherwise relies upon various computer software applications, components, programs, objects, modules, data structures, etc. Moreover, various applications, components, programs, objects, modules, etc. may also execute on one or more processors in another computer coupled to a computer via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, agent, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape and optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As discussed above, a supported product may be any number of computer-related products consistent with the invention. For example, a supported product may be a computer, which may or may not also host an agent server and other product support functionality, as is shown in FIG. 1. In the alternative, a supported product may comprise an installed component that is internal to a computer upon which the product support software components for a customer site are resident. FIG. 2, for example, illustrates a computer 50 having resident thereon a supported product 52 and an agent server 54. The supported product may include, for example, any number of different software or hardware products. For example, from a software standpoint, a supported product may include an application, operating system, microcode, firmware, utility, tool, or practically any other type of software capable of being resident on a computer or one of its components. From a hardware standpoint, the supported product may comprise a peripheral component, an I/O card, a disk drive, a processor, a memory, or practically any other hardware component internal to a computer.

As another example, a supported product may be interfaced with a computer that is the same or different from that which hosts the product support components for a particular customer. FIG. 3, for example, illustrates a computer 60 upon which is resident an agent server 62. Also shown in FIG. 3 is a second computer 64 networked with computer 60, and upon which is resident a supported product 66. In still other instances, a supported product (e.g., product 68) may be wholly separate from a computer, but may comprise another form of hardware component that is interfaced with computer 60, but which is not necessarily housed within a computer. For example, network-based storage, network hardware, and practically any other type of electronic device capable of being accessed via a computer, may be supported in the manner described herein.

It should also be appreciated that a product support system consistent with the invention may support a single type of product, or multiple types, releases, versions, etc., of products. Moreover, a supported product may include hardware, software, or a combination of the two (e.g., an I/O card may incorporate firmware). Furthermore, the product support components at a customer site may be disposed on multiple computers, and the supported product may comprise multiple computers, e.g., a cluster or other system of multiple computers. The numbers, types and variations of computer-related products that may be supported in the manner described herein is practically innumerable, so the invention should not be limited to the particular implementations disclosed herein.

In the illustrated embodiment, the distributed product support system is capable of hosting and executing agents that are resident on a support server, resident on a product server, or both. Moreover, agents running on the same or different servers may be in communication with one another, while certain agents may execute at different times on different servers, and be transferred from server to server as required. Through the provision of an agent platform both on the product support server and on a supported product server, a significant degree of flexibility is therefore often attained.

It will be appreciated that product support need not be provided by the manufacturer, vendor or provider of a particular computer-related product being supported. Put another way, product support may be provided by an entity other than that which originally provided the computer-related product. In addition, it will be appreciated that a product support system may support multiple products, including multiple products on behalf of a single customer and/or multiple products disposed at multiple customer sites.

FIG. 4 illustrates the principal software components utilized in distributed agent-based product support system 10, where a support intelligent agent server 16, resident at a vendor site, is interfaced with a product intelligent agent server 18, resident on a customer site. As used hereinafter, the term "support" will generally be utilized in connection with the vendor or other entity providing product support, while "product" will refer to the customer or other user of a supported product.

In the illustrated implementation, each server 16, 18, functions as a product support program that is utilized in the overall system to provide a portion of the product support functionality described herein. On each server 16, 18 is provided an agent pool 80, 82, respectively. Within support agent pool 80 is typically provided a number of types of agents including shipped product agents 88, downloadable product agents 90, support only agents 92, knowledge base agents 94 and third party agents 96.

Shipped product agents 88 refer to intelligent agents suitable for execution on a supported product, and which are associated with a given release of that product (i.e., they are "shipped" with the product). Downloadable product agents 90, on the other hand, refer to intelligent agents that are created subsequent to shipping of a particular release (i.e., they are "off-release"), and are capable of being downloaded from the support intelligent agent server to a product intelligent agent server for a particular customer.

Support only agents 92 are intelligent agents that are configured for execution only on support intelligent agent server 16, and are not intended to be distributed to customer sites. Knowledge base agents 94 refer to analysis or problem resolution-type agents that are configured to access the operational data collected from multiple customers to identify potential problems, as well as develop potential solutions therefrom.

Third party agents 96 refer to intelligent agents provided by other entities, but which are capable of being incorporated into system 10. For example, a third party agent 96 may be provided by a software or component vendor to assist in the support of that software or component on a larger overall supported product. In other environments, third party agents may be standardized agents developed by other entities, but which are suitable for implementation in providing product support of a particular product. Moreover, in some implementations, some form of encapsulation of third party agents may be required so that such agents will function in the agent environment of system 10.

Product agent pool 82 includes a plurality of agents, such as shipped product agents 100, downloaded product agents 102 and third party agents 104. Of the shipped product agents, these agents are typically duplicates of the corresponding shipped product agents 88 found in support agent pool 80, while downloaded product agents 102 are typically copies of the downloadable product agents 90 from support agent pool 80 that have been downloaded to a particular customer's product intelligent agent server 18. Third party agents 104 may be identical to those in support agent pool 80, or in the alternative, may represent particular types of third party agents that are suitable for execution on a customer's system, rather than on a support system, should a particular vendor provide agents suited for execution on such systems.

It will be appreciated that each agent 88–104 may perform any number of product support operations consistent with the invention. For example, any combination of monitoring operations, data collection operations, data analysis operations, agent selection operations, agent creation operations, configuration detection and/or setting operations, performance tuning operations, etc., may be implemented within an intelligent agent consistent with the invention. Moreover, pools 80, 82 may include other types of agents, or only a subset of the agent types illustrated in FIG. 4.

The underlying framework and execution environment for the agents in pools 80, 82 are provided by agent platform and runtime blocks 106, 108 on servers 16, 18, respectively. While a purely proprietary execution environment may be utilized in some environments, it may be desirable in other environments to provide a standardized, extensible framework to facilitate the creation, execution and interaction of agents in a product support environment. For example, in the illustrated embodiment, the Agent Building and Learning Environment (ABLE) framework, component library, and productivity toolkit from International Business Machines Corporation may be utilized as the underlying environment for implementing product support system 10. The configuration and use of the ABLE environment is understood by one of ordinary skill in the art. However, it should be appreciated that a wide variety of other agent environments, as well as custom or proprietary environments, may be used in the alternative. Moreover, it should also be appreciated that an agent platform may be distributed in nature in some embodiments, e.g., the workload of a particular product or support agent platform may be distributed among multiple computers or systems. Therefore, the invention should not be limited to the particular environment described herein.

Each server 16, 18 also utilizes an agent library management component 110, 112 that is utilized in managing the agents in the agent pool. Furthermore, in support intelligent agent server 16, an agent builder component 114 is provided to assist in the creation of new intelligent agents. Furthermore, an agent publishing control component 116 is utilized to provide control over the publishing of new agents in a manner that associates distribution control information with such agents, as will be discussed in greater detail below.

In general, from a problem determination or identification standpoint, operational data is collected from one or more customer sites and analyzed, with either such operations occurring on the product server and/or on the support server. For example, local environmental data may be stored as shown at 118 in any customer site and accessible via product intelligent server 18. Within such environmental data may be operational data 120 collected by server 18. Such operational data is typically forwarded in some manner to the support intelligent agent server 16, where the operational data is collected as shown at 122. After aggregating and analyzing the collected data, a cross-customer knowledge base 124 is populated with problem identification, solution information, operational and environment data suitable for remedying customer problems or optimizing their environment. It is in part through this unique architecture that various enhanced functionalities such as automated learning capability may be incorporated into a product support system consistent with the invention.

It will be appreciated that the architecture illustrated in FIG. 4 is merely exemplary in nature. Other architectures, as well as other arrangements and types of software components, may be utilized in other environments.

Through the use of the above-identified framework, a wide variety of product support operations may be performed to remedy undesirable operational conditions in a customer product. An undesirable operational condition may include various errors, bugs or other technical problems that prevent the correct operation of the system, or otherwise cause system crashes, incorrect data, or other hardware or software failures. An undesirable operational condition may also include non-optimal operation, e.g., where a computer-related product or another product associated therewith performs at a level that is non-optimal, and capable of being improved. It should be appreciated that an undesirable operational condition may be related directly with respect to the computer-related product, or it may be an undesirable condition with another product, where the undesirable operational condition is due to a problem or defect in the computer-related product (e.g., where a computer system runs poorly, or a particular software application crashes, due to a defect in another software application).

The overall sequence of operations that occur in connection with remedying problems in the product support system disclosed herein is illustrated generally at 150 in FIG. 5. In this exemplary sequence of operations, operational data is collected and thereafter analyzed to identify undesirable operational conditions, and based upon such identification, a remedy agent is selected or created and thereafter published to remedy the undesirable condition on a customer product.

A wide number of variations in this overall sequence of operations will be appreciated from a further reading of the material presented herein.

In the illustrated implementation, the sequence illustrated at 150 begins in block 152 by dispatching monitor agents for the purpose of collecting operational data from one or more customer sites. The monitor agents may be dispatched to the actual customer sites for execution on the customers' product intelligent agent servers, or in the alternative, one or more agents agent may be executed or dispatched on the support intelligent agent server, with that agent provided with remote access capability to retrieve operational data from the customer sites. Thus, data may be brought to the agents, or vice versa, in different embodiments consistent with the invention.

In the alternative, monitor agents may already be installed at either the customer sites or the vendor site, whereby separate dispatch operation would not be required. In such instances, the monitor agents may run continuously, or may be invoked in block 152 on demand.

Next, once the monitor agents are configured for collecting data, operational data is collected as shown in block 154. The operational data may include any number of operational characteristics of a computer-related product or any systems or components associated therewith, and the collection process may be ongoing, or may comprise collecting data for a short time period, or even taking a single snapshot of the configuration of a particular product at a given time. Collection of the operational data also typically results in the operational data being transmitted to the product intelligent agent server so that centralized analysis thereof can be performed.

Next, in block 156, the collected operational data is analyzed, and from such analysis, an undesirable operational condition is identified as shown in block 158. Then, based upon such identification, an appropriate remedy agent is either selected or created. If a suitable agent already exists, that agent will be selected to remedy the problem. If no such agent exists, one may be created, with an appropriate distribution control associated with that agent, as shown in block 160. The use of distribution controls to limit the distribution of agents is discussed in greater detail below.

Once the appropriate remedy agent has been selected or created, that agent is published as shown in block 162, and distributed or otherwise executed to remedy the undesirable condition on one or more customer products. Subsequent to block 162, the problem is remedied, and the operations shown in FIG. 5 are complete.

It should be appreciated that the set of customer sites that are monitored need not be the same as the set of customer sites that receive the remedy agent, e.g., where a remedy agent is dispatched first on a limited basis prior to dispatching the agent to the entire customer base for a product. Moreover, a remedy agent may execute on a support agent server, a product agent server, or both, and such an agent may rely on multiple agents to collectively perform desired tasks.

Implementation of blocks 152–162 of FIG. 5 may occur in a wide variety of manners. For example, FIG. 6 illustrates one such division of resources to remedy a customer problem. In this figure, a product support system 170 is illustrated including a vendor site 172 and a plurality of customer sites 174. Within vendor site 172 is a monitor/collection agent 176 that interfaces with a plurality of monitor/collection agents 178 resident on each of the customer sites 174. In this configuration, each agent 178 collects operational data appropriate for that particular customer, and forwards such data to agent 176 for collection. In many instances, the operational data collected by agent 176 is forwarded to cross-customer knowledge base 180 for the purpose of analysis by a data analysis agent 182. In some instances, however, agent 176 may be provided with sufficient logic to identify known problems and invoke operations on data analysis agent 182 without storing the collected operational data in knowledge base 180. For example, if monitor/collection agent 176 detected a known problem having a known remedy, agent 176 may invoke agent 182 to initiate the appropriate remedy.

In many situations, however, data analysis agent 182 utilizes various learning algorithms such as pattern matching, to attempt to identify undesirable operational conditions from the operational data collected from one or more customers. The results of such analysis are forwarded to a report agent 184, which reports the results of the analysis at appropriate intervals. Based upon the analysis reported by agent 184, an undesirable operational condition identified thereby may be utilized to perform agent selection or creation in block 186. In many environments, block 186 is predominantly a manual operation, particularly with regard to the creation of new agents, although in some environments, sufficient functionality may be provided to permit the automated creation of intelligent agents.

For example, automated functionality may be utilized to either custom configure an agent from a plurality of modules, or in the alternative, select an agent from a pool of like agents, e.g., as described in U.S. Pat. No. 6,192,354 and U.S. patent application Ser. No. 08/822,933, both filed on Mar. 21, 1997 and U.S. patent application 09/100,595 filed on Jun. 19, 1998, by Bigus et al. which are incorporated by reference herein. Furthermore, in some environments, the decision of whether a new agent needs to be created or selected from a pre-existing pool may be made automatically, with the creation of new agents performed as a manual process, e.g., using the agent builder component 114 of FIG. 4.

The result of agent selection/creation is the dispatch of a remedy agent from agent pool 188. As shown in FIG. 6, a remedy agent 190 may be resident on a vendor site to apply the appropriate remedial actions. In the alternative, a remedy agent may be dispatched to one or more customers as shown at 192, with each customer receiving the same copy or a customized copy of the remedy agent. Furthermore, in some environments, multiple remedy agents may be dispatched and operate on the vendor site, the customer site, or in both, with appropriate communications between such agents to collectively perform the desired task.

Various modifications may be made to the implementation illustrated in FIG. 6. For example, monitoring and collecting of operational data may occur solely on a customer site or on a vendor site, and need not require the interaction of agents on both such sites. In addition, monitoring and collection of operational data may be performed by non-agent software, or may be input by a user in some circumstances. Moreover, a combination of manually-input operational data and collected operational data may also be utilized in performing data analysis consistent with the invention.

Furthermore, other remedial operations may be performed in connection with or in lieu of the dispatch of a remedy agent in some environments. For example, some remedies may involve the execution or invocation of non-agent program code, or may involve manual intervention by product support personnel and/or a customer. In the latter instance, a remedy may include simply the notification to a user of the corrective actions that need to be undertaken to remedy a particular condition. In addition, remedial operations performed by a remedy agent or other entity may include refinement of monitoring operations to collect different and/or more specific operational data, in addition to or in lieu of various corrective actions that might be undertaken to remedy an undesirable operational condition.

Furthermore, various manners of initiating a problem remedying operation may be used. For example, monitoring may occur continuously, with identification of a problem triggering a remedial operation whenever undesirable operational conditions are detected. In other embodiments, a customer may notice an undesirable operational condition, and initiate the collection of operational data and analysis thereof to potentially remedy the problem. In addition, analysis of operational data may require manual involvement, e.g, by product support personnel.

Moreover, in some implementations, publication of a remedy agent may occur in stages. For example, where an undesirable operational condition is detected in one customer product, an appropriate remedy agent may be published only for operation on behalf of that customer. Once the agent has been found to have adequately remedied a problem (which may occur only after the agent is modified), the status of the agent may be changed such that greater availability of the agent for other customers is enabled. Thus, for example, after a particular agent has been adequately tested for one particular customer, that agent may thereafter be dispatched to other customers to address similar problems experienced by those customers.

Figure 7:
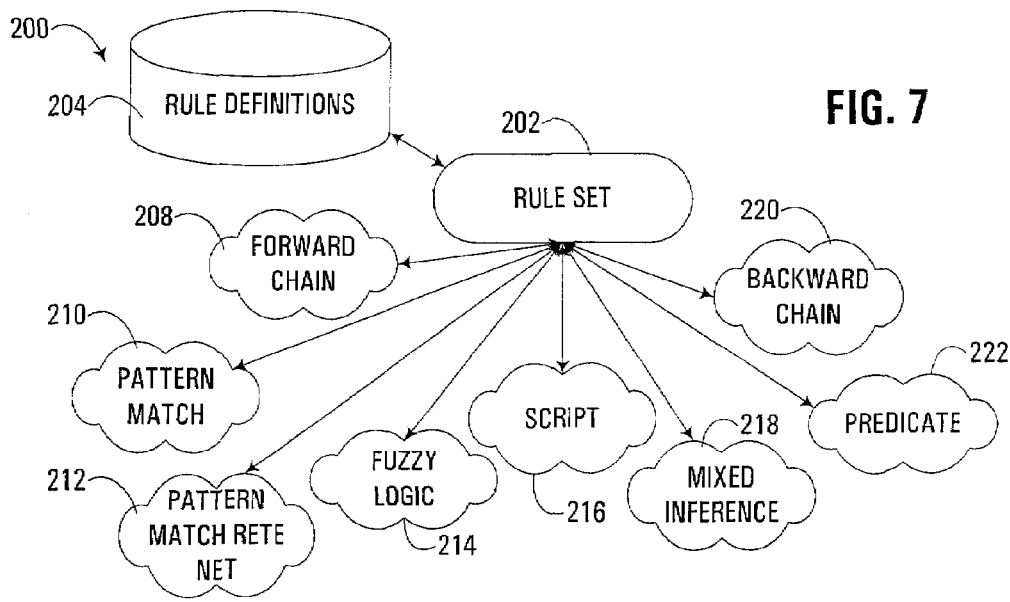
FIG. 7 is a block diagram illustrating a collection of software components suitable for use in implementing an agent framework for hosting the pools of agents in the distributed agent-based product support system of FIG. 1.

The analysis of operational data may occur in a number of manners, and may include a number of known artificial intelligence and decision logic techniques known in the art. For example, as shown in FIG. 7, a structured framework 200 may be provided for analyzing operational data, where a rule set 202 is based upon a set of rule definitions 204 In the illustrated implementation, for example, the ABLE environment may be utilized, with rule definitions defined in a standardized markup language format such as XML and/or defined in a textual format. Via these rule definitions, various types of logic modules, or "beans" may be invoked to perform various analysis operations. For example, forward chain logic 208, pattern matching logic 210, pattern matching RETE net logic 212, fuzzy logic 214, script logic 216, mixed inference logic 218, backward chain logic 220 and predicate logic 222 may be invoked in different combinations to perform various analysis techniques as desired. The implementation of analysis rules based upon this framework would be well within the ability of one of ordinary skill in the art having the benefit of the instant disclosure. However, it should be appreciated that other logic techniques, including hard-coded logic and other combinations of artificial intelligent techniques (e.g., various other neural network technologies, fuzzy logic technologies, non-linear logic, etc.) may be used in the alternative.

Using this logic framework, an analysis agent may be configured to analyze the operational data from one or more customers to identify either an undesirable operational condition for a particular customer (e.g., where a particular supported product installation is operating outside of the specifications of other installations thereof), or to identify an undesirable operational condition across the customer base (e.g., where a particular error is found to occur repeatedly across the customer base). For example, pattern matching may be performed on the operational data to identify recurring patterns that are indicative of an undesirable operational condition.

As also described above, it may be desirable to provide distribution control for intelligent agents utilized in system 10, providing various publication levels that limit the distribution of particular agents based upon the desired use of such agents. As shown in FIG. 8, for example, a publish agent routine 240 begins in block 242 by creating an appropriate agent header. In an environment such as the aforementioned ABLE environment, agents may be defined via headers created using a standardized language such as XML. Under such a framework, characterization of a framework may be embodied within the header, and distribution control information may be incorporated into such characterization information. As shown in block 244, a publishing level is determined for a published agent based upon factors such as the skills required to use the agent, the intended use for the agent, the desired control for the agent, the degree the agent is tied to the knowledge base or to environmental data, and the environments in which the agent is intended to be executed. Once a publishing level is determined, it is set in the agent header in block 246.

In the illustrated embodiment, for example, agents may be classified as "internal", "external" or "base". Table I below illustrates exemplary characteristics of each type of agent based upon the aforementioned characteristics.

TABLE I

| | Agent Publication Level | | |
| --- | --- | --- | --- |
| Characteristics | Internal | External | Base |
| Skill Required | Expert | Administrator | Novice |
| Intended Use | Support | IT Operations | Common |
| Desired Control | Strong | Selective | All |
| Knowledge Base Ties | Tight | Remotable | Loose |
| Environmental Data Ties | Loose | Remotable | Tight |
| Distribution | Remote (Data) | Remote (Agent) | Resident |

A base agent, for example, is intended to be used as an agent provided to a customer within the shipped release of a product. Accordingly, as shown in block 248, it is typically desirable with such an agent to incorporate the agent into the next release of the shipped product. Moreover, for situations where a customer has an earlier release of a product, it may be desirable to permit that customer to download the agent for incorporation into the customer's system. As such, it may be desirable to also transmit the agent to the customer's system on demand, as shown in block 250.

For an external agent, it is typically desirable to transmit the agent to the customer system on demand, as shown in block 250. With such a system, typically the agent is executed without substantial expertise required of the customer.

For an internal agent, such an agent is generally limited to use on a support server by qualified product support personnel. In some instances, however, it may be desirable to distribute the agent to a customer site. Thus, as shown in block 252, it may be desirable to transmit the agent, but in this case only under the guidance of product support personnel.

Therefore, it will be appreciated that, in general the provision of distribution controls permits product support personnel to control the deployment of agents, in particular remedy agents, in such a manner that the availability of a particular agent will be dependent upon the complexity of the problem and its solution, as well as the maturity/effectiveness/accuracy of the agent (e.g., based upon how many other customer products have been successfully remedied by a particular agent), and even a potential desire to keep certain agents proprietary for exclusivity reasons.

It will be appreciated that other publication levels may be associated with particular agents, and that other publishing guidelines and frameworks may be utilized in the alternative. For example, as discussed above, certain agents may be characterized as knowledge base or support only agents, wherein no distribution to other computers is permitted. In still other embodiments, distribution of an agent from a support server to a product server may be prohibited. Moreover, characterization of an agent with a particular distribution control may be made in manners other than through the use of a header, e.g., via a separate database, via various locking mechanisms, encryption mechanisms, signature technologies, etc. Therefore, the invention is not limited to the particular implementation discussed herein.

Figure 9:
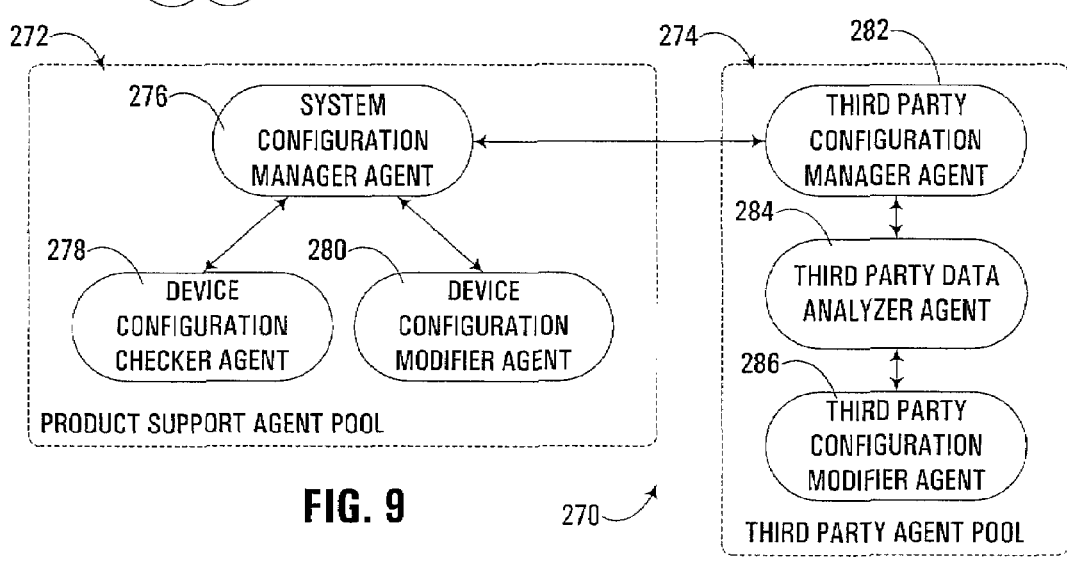
FIG. 9 is a block diagram illustrating an exemplary interaction of agents from multiple vendors in collectively remedying a customer problem in the distrusted agent-based product support system of FIG. 1.

Another capability supported by the herein-described support system is the ability to integrate agents from multiple vendors to collectively remedy undesirable operations of a customer. For example, it may be possible that both a hardware manufacturer and a software vendor will have interoperability problems that require remedial actions to be taken with respect to both a software product and an underlying hardware platform. FIG. 9, for example, illustrates an exemplary condition where a hardware manufacturer, which in this example also serves as the primary product support provider, requires the additional assistance of a software vendor functioning as a third party. FIG. 9 specifically illustrates a system 270 including a product support agent pool 272 and a third party agent pool 274. Through the ability of agents to communicate with one another, as well as to invoke one another and initiate certain actions with one another, it will be appreciated how a sequence of operations may be performed to remedy an undesirable operational condition on a customer system.

In the environment illustrated in FIG. 9, for example, a system configuration manager agent 276 may control the overall remedial operation by interacting with a pair of hardware-related agents 278, 280, as well as a series of additional agents 282, 284 and 286 provided by a third party and related to the software provided by that third party.

Consider, for example, the situation where a particular software program requires a different setting in the hardware or the operating system in order to properly operate on a particular system. Moreover, the software requires specific configuration settings itself to fully remedy a particular problem. In such an instance, system configuration manager agent 276 may address the hardware problems by invoking a device configuration checker agent 278 to check the configuration of a particular hardware device. Based upon the configuration data obtained from agent 278, agent 276 may then invoke a device configuration modifier agent 280 to set the configuration data to appropriate values to remedy the problem. In addition, either concurrently with, subsequent to, or prior to addressing the hardware issue, agent 276 may invoke a third party configuration manager agent 282 that interacts with a third party data analyzer agent 284 and a third party configuration modifier agent 286 to handle the detection and modification of configuration settings in the third party software, thus resulting in a system-wide resolution of the customer's problem.

Figure 10:
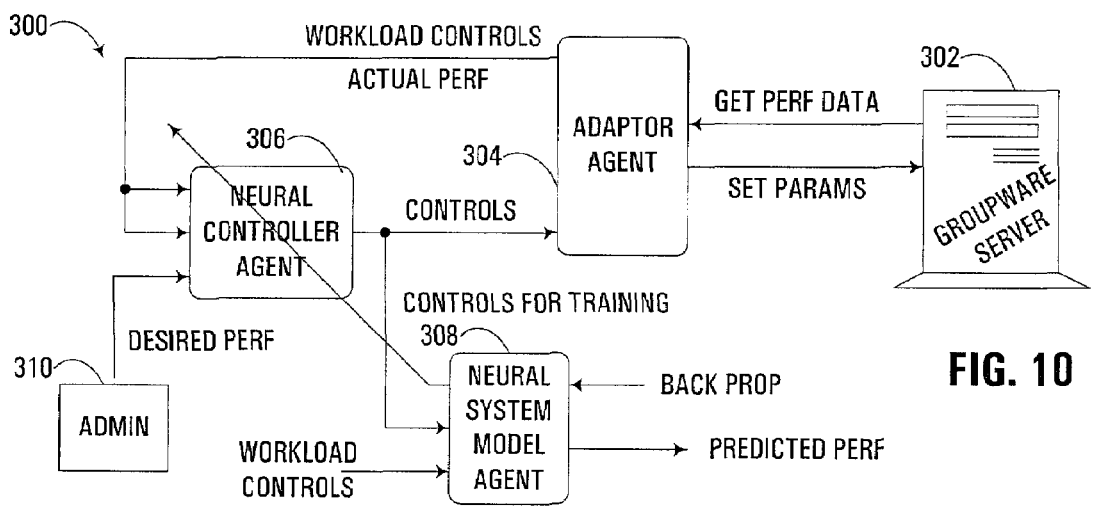
FIG. 10 is a block diagram of an exemplary product support system suitable for tuning the performance of a groupware server in a manner consistent with the invention.

Now turning to FIG. 10, to further illustrate the operation of the various embodiments of the invention, an exemplary product support system 300 is illustrated, which is suitable for use in tuning the performance of a computer-related product, here a groupware server 302. In system 300, the performance of an application (here groupware) is optimized by monitoring and predicting its performance characteristics and then automatically adjusting control parameters in order to provide a desired service level. In this exemplary embodiment, the application is a Lotus Notes server, which often can be subject to a widely varying workload. System 300 may be used to optimize an average response time for specific classes of transactions.

In this exemplary implementation, the product support system relies on three agents (or optionally, modules within a single agent), including an adaptor agent 304 that monitors workload and performance and sets configuration parameters on the Lotus Notes server, a neural system model agent 308 that attempts to learn so as to mimic the performance response characteristics of the groupware server 302 over a range of workloads and control settings, and another neural controller agent 306 that is adapted on-line to determine the appropriate control settings for optimal application performance.

To implement product support in this environment, the neural system model agent 308 is typically trained off-line using data obtained from a workload simulator with varied control settings. Thereafter, an administrator 310 may set a desired performance value, which is fed to agent 306.

During runtime, the groupware server 302 is subjected to a varying workload while the adaptor agent 304 monitors the resulting server performance values. In addition, the neural controller agent 306 is adapted on-line by taking the difference between the desired and actual performance values, back propagating those values through the neural system model agent 308 and using the control deltas as target values for the neural controller agent 306.

It will be appreciated that the aforementioned example is but one possible implementation of a product support process consistent with the invention. Thus, the invention is not limited to this particular example.

Various modifications may be made to the illustrated embodiments consistent with the invention. For example, not all of the tasks associated with providing product support need be implemented using intelligent agents. As such, each of monitoring data, collecting data, analyzing data, identifying undesirable operational conditions, selecting agents, creating agents, and the like may be implemented using non-agent technology, or may incorporate (manual) user involvement, in some embodiments. Moreover, any of monitoring data, collecting data, analyzing data, identifying undesirable operational conditions, selecting agents, creating agents, and the like may be performed at a customer site, at a product support or vendor site, at a third party site, or any combination of the same.

Other modifications will be apparent to one of ordinary skill in the art. Therefore, the invention lies in the claims hereinafter appended.

What is claimed is:

1. An apparatus, comprising:
    (a) first and second product support intelligent agents that perform product support operations in connection with a computer-related product, wherein at least one of the first and second product support intelligent agents that performs at least one of a product support operation that identifies an undesirable operational condition associated with the computer-related product and a product support operation that remedies an undesirable operational condition associated with the computer-related product;
    (b) a first agent platform that executes on a customer computer that utilizes the computer-related product; and (c) a product support program resident on a product support computer used in providing product support for the computer-related product, the product support program including a second agent platform, wherein the product support program that dispatches the first product support intelligent agent to the customer computer for execution by the first agent platform, and initiates execution of the second product support intelligent agent by the second agent platform, wherein the customer and product support computers are respectively disposed at separate customer and vendor sites and are respectively under the control of a customer that uses the computer-related product and a vendor that supplies at least a portion of the computer-related product.

2. The apparatus of claim 1, wherein the first and second product support agents are configured to communicate with one another.

3. The apparatus of claim 1, wherein the first product support intelligent agent is configured to execute on either of the first or second agent platforms.

4. The apparatus of claim 1, wherein the customer computer is the computer-related product.

5. The apparatus of claim 1, wherein the computer related-product comprises at least one of an internal software component, an internal hardware component, an external software component and an external hardware component associated with the customer computer.

6. The apparatus of claim 1, wherein each of the first and second product support intelligent agents is configured to perform a product support operation selected from the group consisting of monitoring operational data, collecting operational data, analyzing operational data, identifying an undesirable operational condition in the customer computer, selecting another intelligent agent to remedy the undesirable operational condition, creating another intelligent agent to remedy the undesirable operational condition, performing at least one task to remedy the undesirable operational condition, and combinations thereof.

7. The apparatus of claim 1, wherein the first product support intelligent agent is configured to collect operational data associated with the computer-related product, and wherein the second product support intelligent agent is configured to analyze the operational data collected by the first product support intelligent agent to identify an undesirable operational condition for the computer-related product.

8. The apparatus of claim 7, wherein the product support program is further configured to dispatch a remedy intelligent agent to remedy the undesirable operational condition.

9. The apparatus of claim 8, wherein the product support program is further configured to create the remedy intelligent agent.

10. The apparatus of claim 9, wherein the product support program is further configured to publish the remedy intelligent agent with a distribution control that limits distribution of the remedy intelligent agent.

11. The apparatus of claim 8, wherein the product support program is further configured to select the remedy intelligent agent from among a plurality of existing remedy agents.

12. The apparatus of claim 8, wherein the product support program is configured to dispatch the remedy intelligent agent between product releases of the computer-related product.

13. The apparatus of claim 1, wherein the second product support intelligent agent is configured to collect operational data from the customer computer while resident on the product support computer.

14. The apparatus of claim 1, wherein the customer computer and the product support computer are coupled to one another over the Internet.

15. The apparatus of claim 1, further comprising a cross-customer knowledge base including operational data associated with a plurality of customers, wherein the second product support intelligent agent is configured to analyze the operational data stored in the cross-customer knowledge base to identify an undesirable operational condition in the computer-related product.

16. The apparatus of claim 15, wherein the second product support intelligent agent is configured to analyze the operational data using logic selected from the group consisting of neural network logic, fuzzy logic, pattern matching logic, script logic, and combinations thereof.

17. The apparatus of claim 1, wherein the first and second product support intelligent agents are associated with different vendors.

18. The apparatus of claim 1, wherein at least one of the first and second product support intelligent agents is configured to perform a product support operation of selecting another intelligent agent to remedy the undesirable operational condition.

19. The apparatus of claim 1, wherein at least one of the first and second product support intelligent agents is configured to perform a product support operation of creating another intelligent agent to remedy the undesirable operational condition.

20. A method of providing product support for a computer-related product, the method comprising:
(a) dispatching a first product support intelligent agent from a product support computer to a customer computer to execute on a first agent platform resident on the customer computer to perform a first product support operation associated with the computer-related product, wherein the customer and product support computers are respectively disposed at separate customer and vendor sites and are respectively under the control of a customer that uses the computer-related product and a vendor that supplies at least a portion of the computer-related product; and
(b) a computer-implemented step of executing a second product support intelligent agent on a second agent platform resident on the product support computer to perform a second product support operation associated with the computer-related product, wherein at least one of the first and second product support intelligent agents is configured to perform at least one of a product support operation that identifies an undesirable operational condition associated with the computer-related product and a product support operation that remedies an undesirable operational condition associated with the computer-related product.

21. The method of claim 20, wherein the first and second product support agents are configured to communicate with one another when performing the first and second product support operations.

22. The method of claim 20, wherein each of the first and second product support operations are selected from the group consisting of monitoring operational data, collecting operational data, analyzing operational data, identifying an undesirable operational condition in the customer computer, selecting another intelligent agent to remedy the undesirable operational condition, creating another intelligent agent to remedy the undesirable operational condition, performing at least one task to remedy the undesirable operational condition, and combinations thereof.

23. The method of claim 20, wherein the first product support intelligent agent is configured to collect operational data associated with the computer-related product, and wherein the second product support intelligent agent is configured to analyze the operational data collected by the first product support intelligent agent to identify an undesirable operational condition for the computer-related product.

24. The method of claim 23, further comprising dispatching a remedy intelligent agent to at least one of the customer computer and the product support computer to remedy the undesirable operational condition.

25. The method of claim 24, further comprising creating the remedy intelligent agent.

26. The method of claim 25, further comprising publishing the remedy intelligent agent with a distribution control that limits distribution of the remedy intelligent agent.

27. The method of claim 24, wherein dispatching the remedy intelligent agent occurs between product releases of the computer-related product.

28. The method of claim 20, wherein the second product support intelligent agent is configured to collect operational data from the customer computer while resident on the product support computer.

29. The method of claim 20, wherein the customer computer and the product support computer are coupled to one another over the Internet.

30. The method of claim 20, wherein the second product support intelligent agent is configured to analyze operational data stored in a cross-customer knowledge base to identify an undesirable operational condition in the computer-related product.

31. The method of claim 30, wherein the second product support intelligent agent is configured to analyze the operational data using logic selected from the group consisting of neural network logic, fuzzy logic, pattern matching logic, script logic, and combinations thereof.

32. The method of claim 20, wherein the first and second product support intelligent agents are associated with different vendors.

33. A program product, comprising:
  (a) first and second product support intelligent agents that perform product support operations in connection with a computer-related product, wherein at least one of the first and second product support intelligent agents that performs at least one of a product support operation that identifies an undesirable operational condition associated with the computer-related product and a product support operation that remedies an undesirable operational condition associated with the computer-related product;
  (b) a first agent platform that executes on a customer computer that utilizes the computer-related product;
  (c) a product support program that resides on a product support computer used in providing product support for the computer-related product, the product support program including a second agent platform, wherein the product support program that dispatches the first product support intelligent agent to the customer computer for execution by the first agent platform, and initiates execution of the second product support intelligent agent by the second agent platform, wherein the customer and product support computers are respectively disposed at separate customer and vendor sites and are respectively under the control of a customer that uses the computer-related product and a vendor that supplies at least a portion of the computer-related product; and
  (d) at least one tangible computer-readable medium bearing the first and second product support agents, the first agent platform, and the product support program.

34. A method of providing product support for a computer-related product, the method comprising:
  (a) collecting operational data from a plurality of customer computers that utilize the computer-related product during operation of the plurality of customer computers;
  (b) identifying an undesirable operational condition associated with the computer-related product from the collected operational data, wherein the identified undesirable operational condition includes a technical problem resulting in at least one of incorrect and non-optimal operation of at least one customer computer;
  (c) creating a product support intelligent agent configured to remedy the undesirable operational condition; and
  (d) distributing the product support intelligent agent to at least first and second customer computers from the plurality of customer computers to remedy the undesirable operational condition in the first and second customer computers, wherein at least one of collecting operational data, identifying the undesirable condition, creating the product support intelligent agent and distributing the product support intelligent agent is computer-implemented.

35. A method of providing product support for a computer-related product, the method comprising:
  (a) collecting operational data from a plurality of customer computers that utilize the computer-related product during operation of the plurality of customer computers;
  (b) with at least a single computer-implemented intelligent agent, analyzing the operational data from the plurality of customer computers; and
  (c) identifying as a result of the analysis an undesirable operational condition associated with the computer-related product in at least one of the customer computers.

36. A computer-implemented method of providing product support for a computer-related product, the method comprising:
  (a) executing a first intelligent agent to perform a first task associated with remedying an undesirable operational condition associated with a customer computer that utilizes the computer-related product, wherein the first intelligent agent is provided by a first vendor that supplies a first component associated with the computer-related product; and
  (b) executing a second intelligent agent to perform a second task associated with remedying the undesirable operational condition, wherein the second intelligent agent is provided by a second vendor that supplies a second component associated with the computer-related product.

* * * * *